3,318,345
STORAGE BATTERY FILLING DEVICE
Richard W. Beall, Jr., 500 Poinsettia Ave.,
Manhattan Beach, Calif. 90266
Filed Mar. 15, 1965, Ser. No. 439,797
11 Claims. (Cl. 141—59)

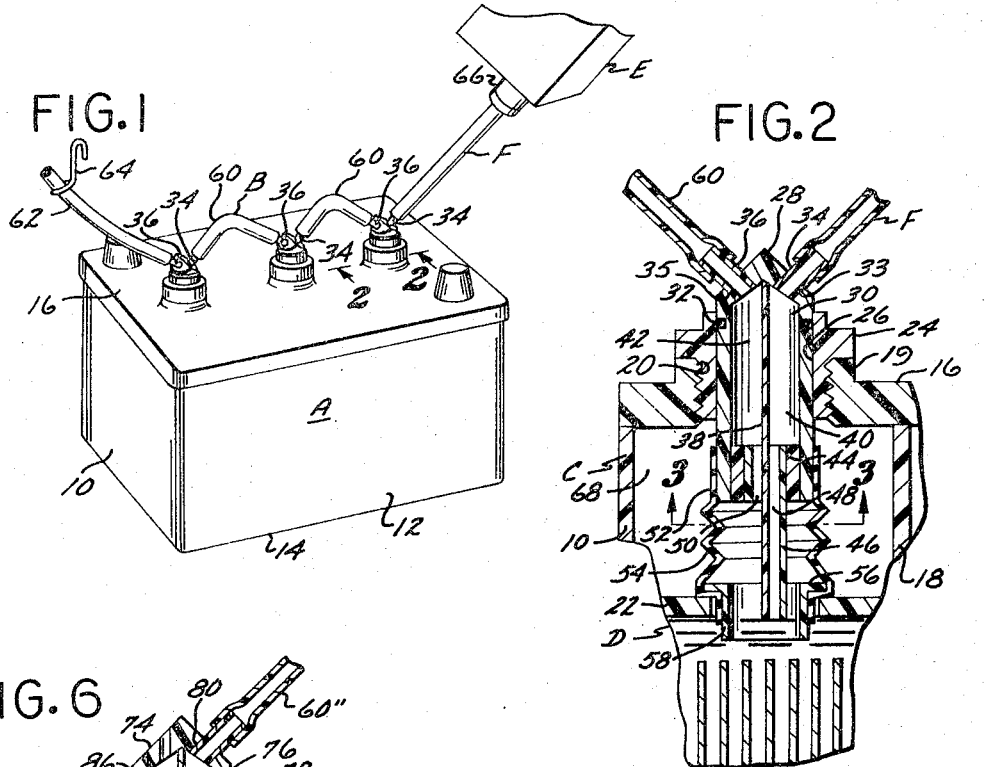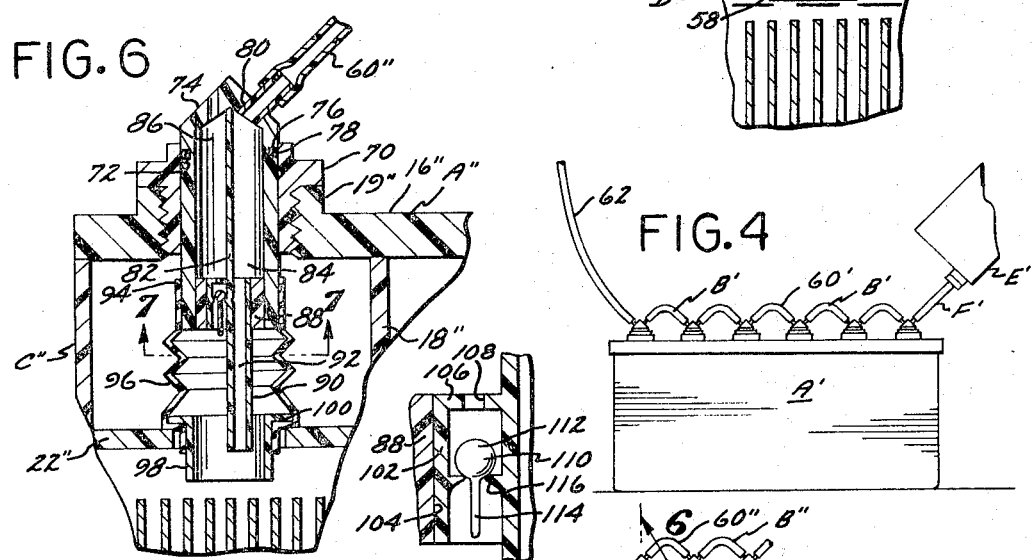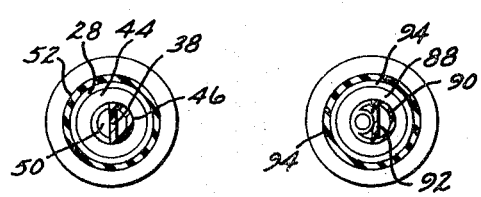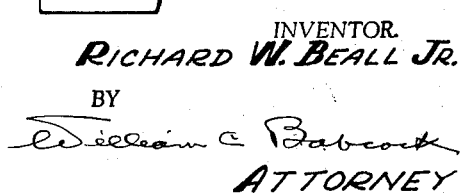

The present invention relates generally to storage battery servicing equipment, and more particularly to a device for filling the cells of a new battery with an acid solution to a predetermined elevation therein.

During the past few years it has become the practice to sell new storage batteries in the dry state, with the acid solution for use in the battery normally being shipped with the battery in a separate package. In such a package, the acid solution is held in a resiliently deformable plastic container which is encased in a protective cardboard shell. When a dealer has sold a battery, the plastic container is opened, and each cell in the storage battery filled with the solution to a predetermined elevation therein. The predetermined elevation is indicated by a target ring situated in the cell below the inlet opening thereof.

Filling of each cell of a new battery with an acid solution to the predetermined elevation is a tedious, time-consuming operation, and one that requires the person performing the operation to examine the interior of the battery to see that the liquid level of the solution has been raised to the predetermined elevation previously mentioned. In many instances, due to human error or carelessness, cells of a storage battery, prior to use of the battery, are either overfilled or underfilled, either of which can shorten the life of the battery.

A primary object of the present invention is to provide a device that can be removably mounted on a new storage battery and connected to the plastic container in which an acid solution is delivered, with the device when so connected, filling each cell of a storage battery with acid solution to a desired predetermined elevation therein within a minimum of time, and with a minimum of inconvenience to the person filling the battery.

Another object of the invention is to supply a device for filling a new storage battery with an acid solution to a predetermined elevation therein without the necessity of checking the interior of the cells.

Another object of the invention is to supply a battery filling device that is of relatively simple mechanical structure, may be easily mounted on or removed from a storage battery, requires a minimum of skill in the use thereof, can be molded, in the main, from polymerized resins that are inert to the action of an acid solution, which due to its simplicity of the structure, can be retailed at a sufficiently low price as to ensure widespread use thereof.

These and other advantages of the present invention will become apparent from the following description of first and alternate forms thereof, and from the accompanying drawing illustrating the same, in which:

FIGURE 1 is a perspective view of a six-volt storage battery with the first form of the battery filler removably mounted thereon, which device when so mounted, is capable of filling the storage battery cells to a predetermined elevation with an acid solution taken from a resilient collapsible container when the container is held at an elevation above the battery;

FIGURE 2 is a fragmentary vertical cross-sectional view of a portion of the filling device shown in FIGURE 1, taken on the line 2—2 thereof;

FIGURE 3 is a transverse cross-sectional view of the device shown in FIGURE 2, taken on the line 3—3 thereof;

FIGURE 4 is a side elevational view of the device mounted on a twelve volt storage battery for filling the cells thereof with an acid solution to a predetermined elevation therein;

FIGURE 5 is a fragmentary cross-sectional view of an alternate form of the device removably mounted on a storage battery for the same purpose as the first form;

FIGURE 6 is a fragmentary vertical cross-sectional view of the alternate form of the device, taken on the line 6—6 of FIGURE 5;

FIGURE 7 is a transverse cross-sectional view of the alternate form of the device, taken on the line 7—7 of FIGURE 6; and FIGURE 8 is an enlargement of a portion of the alternate form of the device.

With continuing reference to the drawing, a six-volt storage battery A is shown in FIGURE 1 on which the first form B of the device is removably mounted to fill each cell C (FIGURE 2) of the battery to a desired predetermined elevation with an acid solution D. The acid solution D discharges into the battery A by force of gravity from a non-vented, resilient container E, and the connection between the device B and container E is effected by a flexible tube F.

After the filling operation is completed, in the manner to be explained in detail, the container E is lowered below the battery A, with surplus acid solution D in the battery discharging back into the container until the solution remaining in the battery is at a predetermined level therein.

The storage battery A is of conventional construction and includes a case defined by end walls 10, side walls 12, a bottom 14 and top 16. Transverse, longitudinally spaced walls 18 are disposed inside the case, as best seen in FIGURE 2, which together with the side walls 12, bottom 14 and top 16, cooperatively define the individual cells C. The cells C disposed at the ends of battery A are partially defined by the end walls 10.

A number of liquid inlet basses 19 project upwardly from the top 16, one of which bosses is shown in FIGURE 2. Each boss 19 has threads 20 formed on the interior thereof. The bosses 19 on the battery A are engaged by threaded plugs (not shown) when the battery is in an operating condition. Each cell C of the storage battery A includes a horizontal target ring 22 as an integral part thereof that is in vertical alignment with one of the bosses 19. Each target ring 22 serves as a visual guide to bring the level of the acid solution in the battery to a desired predetermined elevation relative thereto.

The first form of the invention B can be fabricated for use on either a six-volt storage battery, such as shown in FIGURE 1, or on a twelve-volt storage battery, as shown in FIGURE 4. In the latter figure, the device is identified by the letter B'. The only difference between the form B and form B' is the number of cell-engaging means provided on the devices.

The first form of the device B, as may best be seen in FIGURES 1 and 2, includes a number of threaded tubular members 24 that are adapted to engage the threads 20. Each member 24 has a bore 26 of circular transverse cross section extending downwardly therethrough. A number of inverted straight-walled cup-shaped bodies 28 of transverse circular cross section are provided that extend downwardly through the bores 26, as shown in FIGURE 2. Circular recesses 30 are formed in the upper, external portions of the bodies 28. An O-ring 32 formed of resilient material, is mounted in each recess 30. The bodies 28, due to the O-rings 32, rotatably and sealingly engage the bores 26. First and second spaced passages 33 and 35 are formed in the upper portion of each of the bodies 28 and are connected to tubes 34 and 36 extending upwardly and outwardly from one another, respectively, as illustrated in FIGURE 1.

Each of the bodies 28 is provided with a centrally disposed, longitudinally extending partition 38 that divides the interior of the body into two elongate, first and second spaces 40 and 42, respectively. The first space 40 is in communication with the first tube 34 and the space 42 is likewise in communication with the second tube 36. Each partition 38 is rigidly affixed to a plug 44 that engages the lower interior surface of one of the bodies 28. The partitions 38 preferably extend downwardly below the plugs 44 (FIGURE 2).

A semi-circular wall 46 is associated with the lower part of each partition 38. Each partition 38 and wall 46 cooperatively provide an upwardly extending passage 48 that is in communication with one of the first spaces 40, as may be seen in FIGURE 2. A second passage 50 extends upwardly through each plug 44 that is in communication with the space 42 situated thereabove.

A number of rubber or plastic tubes 52 are provided that are resilient, the upper end portions of which frictionally grip the lower external surfaces of the bodies 28. A series of circumferentially extending corrugations 54 are formed in tubes 52 that permit the tubes to contract or lengthen longitudinally for reasons to be later explained. The lowermost corrugation 54 frictionally grips a flange 56 on a tubular extension 58, and each extension depends from one of the tubes 52, as best seen in FIGURE 2. These portions of the tubes 52 directly below the flanges 56 are adapted to seat on the upper surfaces of the target rings 22. The extensions 58 are of such external diameter that they can project downwardly through the target rings 22.

The second tubes 36 of the bodies 28, as can best be seen in FIGURES 1 and 2, are connected to first tubes 34 situated to the left thereof (FIGURE 1), by a number of flexible conduits 60. The first tube 34 on the right hand end of the battery A is frictionally gripped by the flexible tube F. The second tube 36 on the left hand end of the battery A is connected to a second flexible tube 62, which by an encircling hook 64 or other supporting means, is held in an upwardly extending position relative to battery A during the time the battery is being filled with acid solution D from the container E. The hook 64 may be engaged by a nail (not shown) or other similar protuberance that projects outwardly at a fixed elevation in a building structure (not shown), in which the battery filling operation is performed.

The upper end of the flexible tube F, by means of a conventional connection 66, can be removably affixed to the container E, to permit the acid solution D from the container E to discharge downwardly through the flexible tube when the container is held in the elevated position as shown in FIGURE 1. The first form of the device B is removably mounted on the battery A, by extending the bodies 28 downwardly through the bosses 19, and then rotating the tubular members 24 relative to these bodies to cause the members to engage the threads 20. Because the members 24 cannot rotate relative to the bodies 28, the members 24 may be threaded onto the bosses 19, without disturbing the alignment of the conduits 60.

In dispensing the acid solution D into the battery A, the container E is positioned at the elevated position relative to the battery, as shown in FIGURE 2, whereby the acid solution flows therefrom by force of gravity through the flexible tube F into the battery. The container E which is not vented, is formed from a resilient plastic material, and as the acid solution D discharges therefrom, the pressure of the ambient atmosphere causes the container E to collapse.

As the acid solution D discharges into the cell C on the right-hand end of the battery A, the air in the cell on the right-hand end of the battery will flow to the left to discharge through the conduits 60 and tube 62 into the ambient atmosphere. This discharge of air from cell C on the right-hand end of the battery continues until the liquid level in the cell C rises to the extent that it covers the lower end of the tubular extension 58. The liquid solution D will thereafter continue to rise in the cell C on the right-hand end of the battery, until the air in the confined space 68 in the cell is under sufficient pressure that it will support a column of acid solution D in the tube 52, passage 50, second space 42, tube 36, and the conduit 60 leading from this cell.

Acid solution D will flow through the conduit 60 previously referred to into the cell C of the battery A adjacent thereto, whereupon the above described operation will be repeated. The cells C will be sequentially filled with solution D until a column of solution rises in the cell on the left-hand end of the battery A (FIGURE 1) into the second space 42, second tube 36, and tube 62. When the liquid solution rises into the tube 62, a visual signal is given indicating that the battery has been completely filled with the acid solution D.

The container E is then lowered to a position below the battery A whereby the air under pressure in the spaces 68 will start forcing the solution D in the cells C to reverse the previously described flow, and pass from the battery A, flexible tube F into the container E. This operation will continue until the level of the solution D in the cells C has been lowered to slightly below the lower edge of the tubular extension 58, whereupon the air in the spaces 68 is in communication with an ambient atmosphere through the conduits 60 and tube 62, and there is no tendency for any further flow of solution D from the battery A into the container E.

When the container E is placed in a lowered position, a negative pressure exists therein due to not being vented and the fact that a substantial part of the solution D initially contained therein has been discharged therefrom. This negative pressure in container E cooperates with the air under pressure in spaces 68 to cause flow of acid solution D from the cell C of the battery, with this flow continuing until the liquid level of the solution in the battery has been lowered to a predetermined elevation relative to the target rings 22.

The form B' of the device shown in FIGURE 4 is structurally the same as that form just described, except that form B' includes additional elements for engaging the additional inlets in a twelve volt storage battery. The forms B and B' operate in the same manner.

The alternate form B" of the invention, as shown in FIGURE 6, is identical to the first forms B and B', as shown in FIGURES 1 and 4, other than that the assembly shown in FIGURE 2 is replaced by an assembly which is illustrated in FIGURES 6, 7 and 8, for use on the left-hand cell C" of the battery shown in FIGURE 1. The boss 18" of the battery A" is engaged by a threaded tubular member 70 through which a bore 72 extends in which an inverted elongate cut-shaped body 74 is mounted. A recess 76 is formed in body 74 in which an O-ring 78 is disposed that sealingly engages the surface of the bore 72.

A tube 80 extends from the upper portion of body 74 and is in communication with a conduit 60" in the same manner illustrated in FIGURE 1. A partition 82 is longitudinally disposed in the body 74 which divides the interior of this body into a first space 84 and second space 86. Partition 82 is at least partially supported in the body 74 by a plug 88 that engages the lower interior portion thereof. A semicircular wall 90 extends outwardly from the lower portion of partition 82 and cooperates with the partition to provide an elongate passage 92 that is in communication with the first space 84.

A resilient tube 94 grips the lower external portion of the body 74 and depends therefrom. A number of circumferentially extending corrugations 96 are formed in tube 94, and the lowermost of these corrugations supports a tubular extension 98 that is provided with an outwardly projecting flange 100. A valve body 102 is situated to the left of partition 82 as viewed in FIGURE 6, which is insertable in a bore 104 formed in the plug 88. The valve body 88 has an upper end 106 in which a discharge port 108 is formed. A float 110 is provided which includes a ball 112, from which an extension 114 depends. Ball 112 rests on a number of circumferentially spaced prongs 116 that extend inwardly from the partition 82 and interior surface of the valve body 102, as best shown in FIGURE 8.

The prongs 116 permit air to flow upwardly around the ball 110 to discharge through the port 108. However, when water arises in the interior of the valve body 102, the float 110 moves upwardly due to the buoyancy thereof, whereby the ball 112 seats in the lower portion of port 108 to provide discharge of liquid upwardly through the port.

The alternate form B″ of the invention is used in the same manner as the first form B thereof previously described. When the cells C″ of the battery A″ have been filled with liquid to the extent that the ball 110 seats in the discharge port 108, no further liquid will flow into the battery from the container E″. The container E″ is then placed in a position below the battery A″, whereby the compressed air in the cells C″ above the liquid therein will cause reverse flow of the acid solution D″ to the container until the liquid level in the cells of the battery has been reduced to a predetermined level, relative to the target rings 22″. When the level of the solution in the battery A″ has reached that position relative to the target rings 22″, further flow of acid solution from the battery ceases, in the same manner and for the same reasons given in connection with the preferred form of the device.

Although the present invention is fully capable of achieving the objects and providing the advantages hereinbefore mentioned, it is to be understood that it is merely illustrative of the presently preferred embodiments thereof and I do not means to be limited to the details of construction herein shown and described, other than as defined in the appended claims.

I claim:

1. A device adapted to be connected to a flexible tube extending from a deformable resilient non-vented container holding an acid solution to fill each of the individual cells of a storage battery with said solution to a predetermined level therein above the plates in said cell, each of which cells have a threaded inlet opening formed in the upper portion thereof, with a target ring situated below said opening, which device includes:
   (a) a plurality of threaded tubular members that can removably engage said threaded inlets;
   (b) a plurality of inverted elongate cup-shaped bodies longitudinally disposed in said tubular members, each of which bodies have spaced first and second passages formed in the upper portion thereof;
   (c) first means for sealingly and rotatably supporting said bodies in said tubular members;
   (d) second means for dividing the interior of each of said bodies into first and second longitudinally extending spaces that are in communication with said first and second passages;
   (e) a plurality of corrugated resilient tubes depending from the lower ends of said bodies, with the lowermost of each of said corrugations being adapted to seat on one of said target rings;
   (f) a plurality of tubular extensions depending from said lowermost corrugations, with the external diameter of said extensions being less than the interior diameter of said target rings;
   (g) a plurality of flexible conduits that extend between said bodies, with the ends of each conduit being in communication with a first passage in one of said bodies and a second passage formed in an adjacently disposed one of said bodies;
   (h) third means for connecting said flexible tube to said first pasage in one of said bodies that is disposed in a first end-positioned cell in said battery, which container when held above said battery discharges acid solution into said end-positioned cell due to force of gravity until said solution has risen above the lower end of said tubular extension to the extent that the pressure is increased on air confined in said cell to the extent that said solution rises in said second space and flows through said second passage to sequentially fill the balance of said cells in said battery; and
   (i) fourth means in communication with said second passage formed in a one of said bodies disposed in a second end-positioned cell for indicating that all of said cells have been filled with said solution, with the air under pressure in said cells above said solution therein forcing said solution therefrom through said conduits towards said container when said container is moved to a position lower than that of said battery, whereupon said flow of solution to said container continues until said predetermined level is reached at which the liquid level in said cells is slightly below the lower extremity of said extensions and the spaces above said solution in said cells is vented to the ambient atmosphere through said conduits and fourth means.

2. A device as defined in claim 1 wherein said first means comprises a plurality of resilient O-rings mounted in circumferentially extending grooves on the exterior surfaces of said bodies, with said O-rings being in pressure contact with the interior surfaces of said tubular members.

3. A device as defined in claim 1 wherein each of said third means comprises a longitudinally extending partition disposed in one of said bodies.

4. A device as defined in claim 1 wherein each of said third means comprises a partition that extends the length of the interior of one of said bodies and projects therebelow.

5. A device as defined in claim 1 wherein each of said tubular extensions includes:
   (j) a tubular shell; and
   (k) a ring-shaped flange projecting outwardly from the upper end of said shell, which flange is resiliently gripped by a lower exterior portion of one of said tubes.

6. A device as defined in claim 1 wherein said third means comprises a tube that projects upwardly from said body disposed in said first end-positioned cell, which tube is in communication with said first longitudinally extending space in said body in said first end-positioned cell.

7. A device as defined in claim 1 wherein said fourth means comprises a tube that extends above said battery during the filling operation and is in communication with said second space in said body disposed in said second end-positioned cell, which tube visually indicates when said battery is filled as said solution rises therein.

8. A device as defined in claim 1 wherein said fourth means comprises a normally open float valve vented to the ambient atmosphere and in communication with said second space in said body which is disposed in said second end-positioned cell, which float valve closes when said battery is filled with said solution.

9. A device as defined in claim 1 which further includes:
   (j) a plurality of plugs that close the lower interior portions of said bodies, with each of said plugs having first and second passages formed therein that are in communication with said first and second spaces of said body with which said plug is associated.

10. A device as defined in claim 9 wherein said fourth means comprises a float valve disposed in said second passage in said plug located in said second end-positioned cell.

11. A device as defined in claim 9 wherein each of said second means comprises a longitudinally extending partition, which at the upper end of each of said plugs develops into a tubular member that extends through said plug, with each of said tubular members defining one of said first pasages in one of said plugs.

References Cited by the Examiner

UNITED STATES PATENTS

| | | | |
|---|---|---|---|
| 2,140,432 | 12/1938 | Nomiya | 137—571 X |
| 2,141,079 | 12/1938 | Bolich | 137—571 X |
| 2,161,776 | 6/1939 | Orr | 137—571 X |
| 3,052,745 | 9/1962 | Frankmann | 136—162 |

LAVERNE D. GEIGER, *Primary Examiner.*

H. S. BELL, *Assistant Examiner.*